United States Patent [19]

Herman

[11] 4,081,013
[45] Mar. 28, 1978

[54] TRACTION SHOE SEAL
[75] Inventor: Eugene T. Herman, Saint Marys, Ohio
[73] Assignee: The Goodyear Tire & Rubber Company, Akron, Ohio
[21] Appl. No.: 646,555
[22] Filed: Jan. 5, 1976
[51] Int. Cl.² .......................................... B60C 27/20
[52] U.S. Cl. ................................. 152/179; 152/182
[58] Field of Search ............... 152/173, 176, 188, 182, 152/190, 191, 178, 179, 227, 209 B; 305/19, 35 EB, 37, 38

[56] References Cited
U.S. PATENT DOCUMENTS

| 3,720,448 | 3/1973 | Allen | 305/19 |
| 3,773,394 | 11/1973 | Grawey | 305/19 X |
| 3,853,359 | 12/1974 | Pusch | 305/35 EB |
| 3,899,220 | 8/1975 | Grawey et al. | 305/19 |

FOREIGN PATENT DOCUMENTS
732,327  2/1943  Germany .................. 305/46

Primary Examiner—Robert B. Reeves
Assistant Examiner—Francis J. Bartuska
Attorney, Agent, or Firm—F. W. Brunner; R. P. Yaist; Frederick K. Lacher

[57] ABSTRACT

A seal between the surface of a traction shoe and the belt of a removable track for a tire in which the belt-engaging surface of the shoe has a groove extending axially of the track. An elongated sealing member is located in the groove and has a thickness greater than the depth of the groove for sealing engagement with the shoe-engaging surface of the belt. The groove may extend along the side and end edges of the shoe and the sealing member may be an endless strip of material providing a seal completely around the belt-engaging surface of the traction shoe.

14 Claims, 4 Drawing Figures

U.S. Patent    March 28, 1978    4,081,013
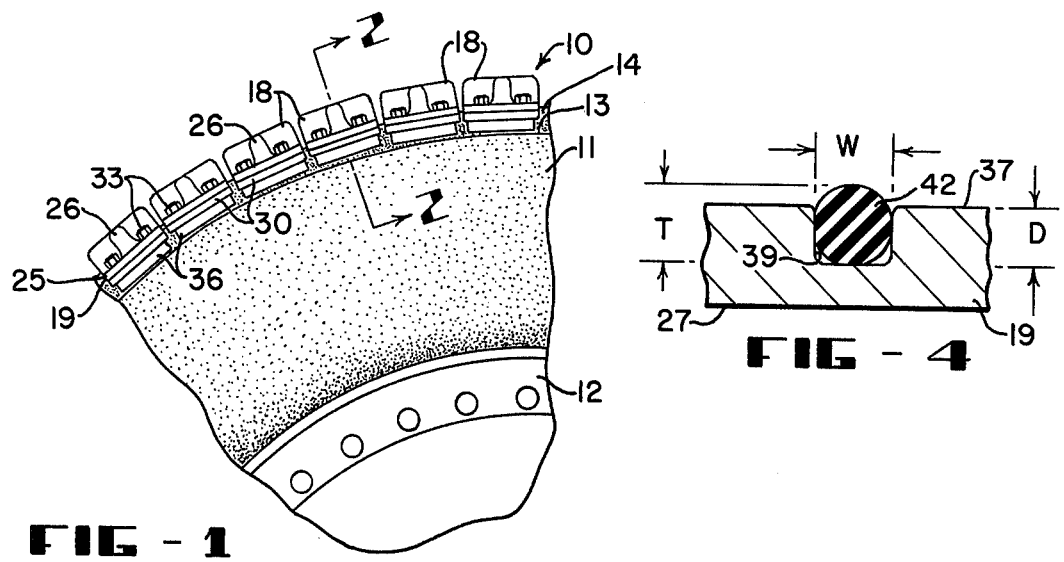
FIG-1
FIG-4
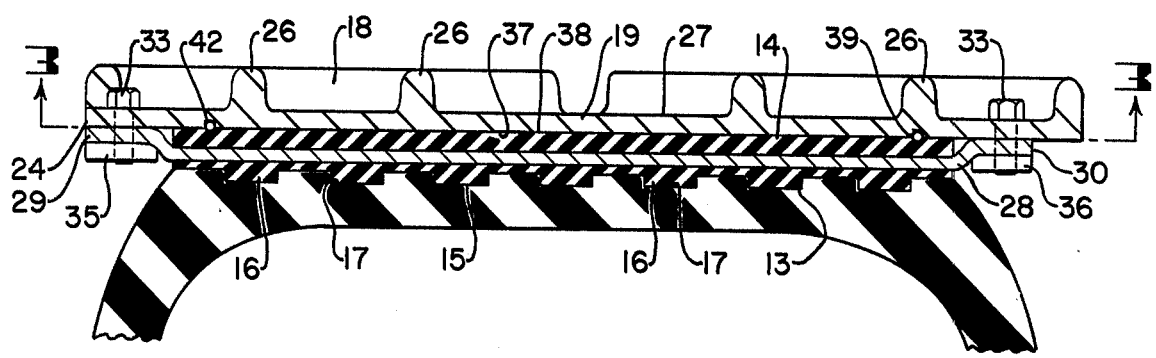
FIG-2
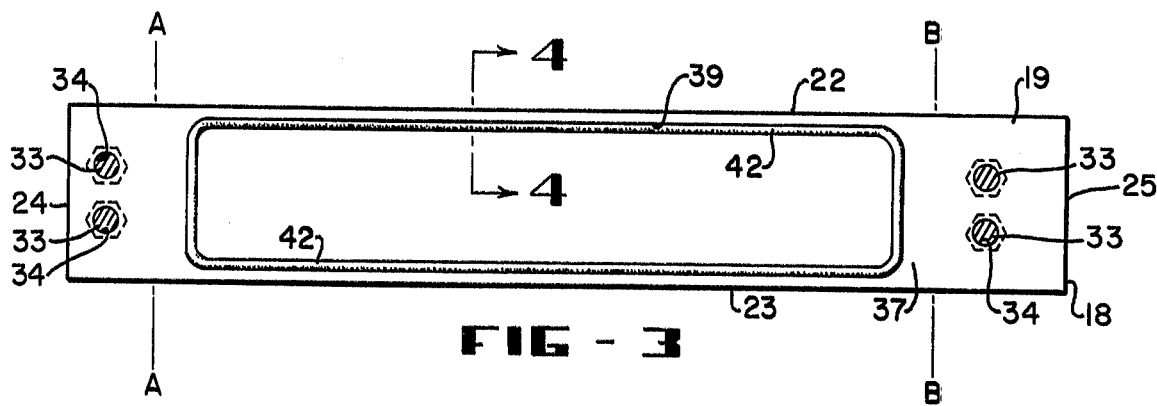
FIG-3

TRACTION SHOE SEAL

This invention relates generally, as indicated, to a removable track mounted on the outer circumference of an annular resilient tire. The track includes an annular flexible belt for engagement with the tire and has a plurality of metal traction shoes mounted on the radially outer surface of the belt at spaced-apart positions circumferentially of the belt. Mounting bars extend axially of the belt at circumferentially spaced-apart positions and have ends extending beyond the edges of the belt for fastening to the traction shoes and clamping the shoes to the radially outer surface of the belt.

Removable track-tire assemblies of this type are used where the ground conditions are highly abrasive and cause excessive tread wear of conventional off-the-road tires. The traction shoes of metal provide better wear characteristics and when they are worn out, they can be replaced by new traction shoes providing the belt of the track is in suitable condition. It has been found that under certain conditions abrasive dust, dirt and rock particles have worked their way between the traction shoes and the belt because the clamping of the shoes to the belt did not provide a proper seal. The presence of this abrasive material between the shoes and the belt caused wearing of the belt under the shoes and necessitated premature replacement of the belt which increased the operating costs.

Heretofore, transverse ribs and grooves have been provided in the mating surfaces of the belt and traction shoes to seal the space between the traction shoes and belt. Also the axially extending leading and trailing edges of the traction shoes have been curved radially inward in an attempt to provide a better seal. In both of these cases, the seal has been between the shoes of steel and the belt which is of a flexible material compounded for weathering, adhesion to the reinforcing wires and tensile strength. Belt material of this kind may be compressed; however, in view of the other material requirements, it may have a compression set. In order to obtain a material without a compression set, other important properties of the belt may be sacrificed. Accordingly, the material limitations have made it difficult to provide a seal of the type proposed heretofore while at the same time retaining the necessary material specifications for good service. The seals proposed heretofore have also been limited to the axially extending leading and trailing edges of the shoes and no provision has been made for preventing material entering the space between the shoes and belt at the edges of the belt.

During manufacture of the belt using standard methods, variations in the thickness of the belt have resulted which further increase the need for adequate sealing of the space between the shoes and the belt. For example, rubber shrinkage during vulcanization may cause thickness variations. Then because the traction shoes are clamped to the mounting bars at the edges of the belt, there is a variation in compression between the belt and traction shoes making it more difficult to seal the space between the shoes and belt. Further, where attempts have been made to match sealing surfaces on the belt with sealing surfaces on the shoes, problems have occurred due to the difficulty in obtaining accurate spacing between the mounting bars at circumferentially spaced-apart positions around the belt.

With the foregoing in mind, it is the principal object of this invention to provide a sealing member of a different material from the materials of the belt and shoes for sealing the space between the traction shoes and belt.

Another object is to provide for retaining a sealing member on the belt-engaging surface of the shoes.

Still another object is to provide for positioning the sealing member along all of the edges of the traction shoe.

A further object is to provide an endless sealing member providing a continuous seal around the edges of the traction shoe.

A still further object is to provide a sealing member of a material having a different hardness than the material of the shoe-engaging surface of the belt.

These and other objects of the present invention may be provided by a sealing member positioned in a groove in the belt-engaging surface of the traction shoe extending transversely of the shoe and having a thickness greater than the depth of the groove. The groove may extend around the edges of the belt-engaging surface and the sealing member may be endless to provide a complete sealing of the space between the shoe and the belt.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a fragmentary side elevation of a removable track-tire assembly mounted on a rim.

FIG. 2 is an enlarged fragmentary sectional view taken along the plane of line 2—2 in FIG. 1.

FIG. 3 is a view taken along the plane of line 3—3 in FIG. 2 showing the belt-engaging surface of one of the traction shoes.

FIG. 4 is a still further enlarged fragmentary sectional view taken along the plane of line 4—4 in FIG. 3 showing the sealing member and groove in the belt-engaging surface of one of the shoes.

Referring to FIG. 1, a removable track 10 is shown mounted on an annular resilient tire 11 which in turn is mounted on a rim 12 having bolt holes for bolting to a wheel (not shown). As shown more clearly in FIG. 2, the tire 11 may be of a resilient rubber or other rubberlike material reinforced by plies (not shown) and have an outer circumferential surface 13 on which a belt 14 of the track 10 is mounted. The belt 14 is an annular body of resilient rubber or other rubberlike material reinforced by circumferentially extending cords of steel or other substantially nonextensible material (not shown). The belt 14 has a tire-engaging surface 15 which may have circumferentially extending ribs 16 for seating in circumferentially extending matching grooves 17 in the outer circumferential surface 13 of the tire 11. In the preferred embodiment, the tire 11 is pneumatic and the belt 14 of the track 10 is held on the outer circumferential surface 13 of the tire by inflation of the tire providing torque transmitting engagement between the tire and belt.

The belt 14 extends longitudinally along the circumference of the tire 11 and carries a plurality of circumferentially spaced-apart grousers or traction shoes 18 which may be of steel or other wear-resisting material for engagement with the ground. As shown more clearly in FIGS. 2 and 3, each of the traction shoes 18 has an elongated generally rectangular plate member 19 with transversely extending side edges 22 and 23 and longitudinally extending end edges 24 and 25. Raised traction bars 26 are positioned on a ground-engaging surface 27 of the plate member 19 in a suitable configuration to provide traction and lateral stability in operation.

Mounting bars 28 may be molded in the belt 14 at spaced-apart positions longitudinally of the belt for clamping the traction shoes 18 to the belt. The mounting bars 28 extend transversely of the belt 14 or axially of the track 10 and have bar ends 29 and 30 projecting from the sides of the belt 14 which are bent towards the traction shoes 18 for engagement with the plate member 19 of each of the traction shoes. Fasteners such as bolts 33 extend through openings 34 in the plate member 19 and through the bar ends 29 and 30 of the mounting bars 28 for threaded engagement with threaded holes in retainer plates 35 and 36 located on the other side of the bar ends from the plate member. Tightening of the bolts 33 urges a belt-engaging surface 37 of the plate member 19 against a plate-engaging surface 38 of the belt 14.

The belt-engaging surface 37 of the plate member 19 has a groove 39 adjacent to and extending along the side edge 22 of the plate member for partially containing a sealing member such as elongated sealing strip 42. The groove 39 may extend along the end edges 24 and 25 and also along the other side edge 23, as shown in FIG. 3, providing a continuous groove around the belt-engaging surface 37 of the plate member 19. As shown in FIG. 3, the openings 34 for the bolts 33 are positioned between the groove 39 and the end edges 24 and 25 so that the sealing strip 42 will have uninterrupted engagement with the plate-engaging surface 38 of the belt 14. The position of the belt edges on the belt-engaging surface 37 of the plate member 19 is shown by chain-dotted lines A—A and B—B in FIG. 3. Preferably, the groove 39 and sealing strip 42 are positioned on the belt-engaging surface 37 at a position close to the side edges 22 and 23 and, in the preferred embodiment, the edge of the groove 39 is not over one-half inch from the side edges. The edge of the groove 39 is also not over one-half inch from the location of sides A—A and B—B of the belt 14, as shown in FIG. 3.

With reference to FIG. 4, the sealing strip 42 has a circular cross section with a diameter or thickness T greater than the depth D of the groove 39. In the preferred embodiment, the diameter or thickness T of the sealing strip 42 is 0.22 inches and the depth D of the groove is 0.17 inches. Preferably, the depth D of the groove 39 is not greater than eight-tenths the diameter T of the sealing strip 42 and not less than one-half the diameter T of the sealing strip. The sealing strip 42 is an endless body of rubber or rubberlike material and may have a length the same as the length of the groove 39 so that when it is installed in the groove, it will not be under tension. As shown in FIG. 4, the width W of the groove 39 is slightly less than the diameter or thickness T of the sealing strip 42 so that the sealing strip will stay in the groove during installation.

Preferably, the material of the sealing strip 42 is of a different hardness than the material of the plate-engaging surface 38 of the belt 14 and, in the preferred embodiment, the material of the sealing strip 42 has a Shore A hardness of 45 plus or minus 5 while the material of the plate-engaging surface 38 has a Shore A hardness of 75 plus or minus 5. The material of the sealing strip 42 may be natural rubber, synthetic rubber or a combination and, in the embodiment shown, has a tensile strength of 400 to 425 p.s.i. The material of the plate-engaging surface 38 of the belt 14 may be of natural rubber or synthetic rubber or a combination of both and in the embodiment shown has a tensile strength of 3000 p.s.i.

When the plate member 19 of each of the traction shoes 18 is clamped to the plate-engaging surface 38 of the belt 14, the sealing strip 42 will engage the plate-engaging surface. Where the fit between the belt-engaging surface 37 and plate-engaging surface 38 is close, the sealing strip 42 will be compressed into the groove 39. Where there is a gap between the surfaces 37 and 38, the sealing strip 42 will extend into engagement with the plate-engaging surface and prevent ingress of dust, dirt and rock particles between the plate member 19 and belt 14.

During operation of the track 10 and tire 11 assembly, the traction shoes 18 will be subject to variable stresses. There will be articulation of the traction shoes 18 as they engage the ground. This relative movement may change the relative positions of the belt-engaging surface 37 and plate-engaging surface 38 of the traction shoes 18 and belt 14 and the resilient material of the sealing strip 42 will maintain the seal during these changes in relative position of the belt and traction shoes.

With this construction, the sealing strip 42 may be placed in the groove 39 of the traction shoe 18 before it is clamped on the belt 14 and the sealing strip may be replaced simply by removing the traction shoe and inserting a new strip.

In some applications where the material of the plate-engaging surface 38 of the belt 14 is inherently relatively soft, the material of the sealing strip 42 may have a greater hardness than the material of the plate-engaging surface. Then upon clamping of the traction shoes 18 to the belt 14, the deflection of the sealing strip 42 will be less and the deflection of the material of the plate-engaging surface 38 will be greater. This will result in greater penetration of the sealing strip 42 into the surface 38 of the belt 14 than when the material of the belt has a greater hardness than the material of the sealing strip. In any case, the interaction between the resilient materials of the sealing strip 42 and belt 14 provides an improved seal which is economical to manufacture, install and maintain.

While a certain representative embodiment and details has been shown for the purpose of illustrating the invention, it will be apparent to those skilled in the art that various changes and other modifications may be made therein without departing from the invention.

What is claimed is:

1. A traction shoe for mounting on a longitudinally extending belt of a belt-type removable track for an annular resilient tire comprising a plate member having an elongated, generally rectangular shape, said plate member having a belt-engaging surface with transversely extending side edges and longitudinally extending end edges, a groove in said belt-engaging surface extending transversely of said plate member at a position adjacent at least one of said side edges and a separate sealing member of resilient material disposed in said groove, said belt having a plate-engaging surface, said separate sealing member having a thickness greater than the depth of said groove whereby upon mounting of said shoe on said belt with said belt-engaging surface pressed into engagement with said plate-engaging surface of said belt said separate sealing member will resiliently engage said plate-engaging surface and prevent ingress of soil and rock between said plate-engaging surface and said belt-engaging surface.

2. A traction shoe in accordance with claim 1 wherein said sealing member has a circular cross section with a diameter greater than the depth of said groove.

3. A traction shoe in accordance with claim 2 wherein said groove has a width slightly smaller than the diameter of said sealing member.

4. A traction shoe in accordance with claim 3 wherein said depth of said groove is not greater than eight-tenths said diameter of said sealing member.

5. A traction shoe in accordance with claim 1 wherein said groove extends along both of said side edges and across said plate member near said end edges.

6. A traction shoe in accordance with claim 5 wherein said plate member has openings adjacent said end edges for fastening said shoe to said belt and said openings are positioned intermediate said groove and said end edges.

7. A traction shoe in accordance with claim 5 wherein said sealing member is endless and has a length the same as the length of said groove for installation of said sealing member without tension.

8. A traction shoe in accordance with claim 1 wherein the material of said sealing member has a different hardness than the material of said plate-engaging surface of said belt whereby one of the materials will deflect a greater amount than the other of the materials to provide a seal between said belt-engaging surface and said plate-engaging surface.

9. A traction shoe in accordance with claim 8 wherein the material of said sealing member is softer than the material of said plate-engaging surface of said belt.

10. A removable track for an annular, resilient tire comprising an annular belt for mounting on said tire, a plurality of traction shoes mounted on said belt at circumferentially spaced-apart positions, each of said shoes including an elongated, generally rectangular plate member, said plate member having a belt-engaging surface with axially extending side edges and circumferentially extending end edges, a groove in said belt-engaging surface extending axially of said plate member at a position adjacent at least one of said side edges and a separate sealing member of resilient material disposed in said groove, said belt having a radially outer plate-engaging surface, said separate sealing member having a thickness greater than the depth of said groove whereby upon mounting of each of said shoes on said belt with said belt-engaging surface pressed into engagement with said plate-engaging surface said separate sealing member of each of said shoes will resiliently engage said plate-engaging surface of said belt and prevent ingress of soil and rock between said plate-engaging surface of said belt and the belt-engaging surface of said plate member.

11. A removable track in accordance with claim 10 wherein said groove of each said plate member is continuous and extends along both said side edges and across said plate member near said end edges.

12. A removable track in accordance with claim 11 wherein axially extending mounting bars are mounted in said belt at circumferentially spaced-apart positions, each of said bars having ends extending axially outward from said belt and said ends being fastened to said plate member of each of said shoes, said plate member having openings adjacent said circumferential edges for fastening said ends of said mounting bars to said plate member and said openings being positioned intermediate said groove and said end edges of said plate member of each of said shoes.

13. A removable track in accordance with claim 11 wherein said sealing member of said plate member of each of said shoes is endless and has a length the same as the length of said groove for installation of said sealing member of each of said shoes without tension.

14. A removable track in accordance with claim 10 wherein the material of said sealing member of said plate member has a different hardness than the material of said plate-engaging surface of said belt whereby one of the materials will deflect a greater amount than the other of the materials to provide a seal between said belt-engaging surface of said plate member and said plate-engaging surface of said belt.

* * * * *